United States Patent [19]

Du et al.

[11] Patent Number: 5,327,449

[45] Date of Patent: Jul. 5, 1994

[54] LASER RESONATOR

[75] Inventors: Keming Du; Peter Loosen, both of Aachen, Fed. Rep. of Germany

[73] Assignee: Fraunhoefer-Gesellschaft zur Foerderung der Angewandten Forschung e.V., Fed. Rep. of Germany

[21] Appl. No.: 601,756

[22] PCT Filed: Apr. 21, 1989

[86] PCT No.: PCT/DE89/00249

§ 371 Date: Jun. 1, 1992

§ 102(e) Date: Jun. 1, 1992

[87] PCT Pub. No.: WO89/10640

PCT Pub. Date: Nov. 2, 1989

[30] Foreign Application Priority Data

Apr. 22, 1988 [DE] Fed. Rep. of Germany ....... 3813567

[51] Int. Cl.⁵ ............................................... H01S 3/08
[52] U.S. Cl. .......................................... 372/95; 372/97; 372/99; 372/108
[58] Field of Search ............... 372/92, 95, 108, 99, 372/97

[56] References Cited

U.S. PATENT DOCUMENTS

| | | | |
|---|---|---|---|
| 3,466,566 | 9/1969 | Patel | 372/99 |
| 3,873,942 | 3/1975 | Reilly | 372/95 |
| 4,156,209 | 5/1979 | Herbst et al. | 372/95 |
| 4,219,254 | 8/1980 | Macken | 372/99 |
| 4,221,468 | 9/1980 | Macken | 372/99 |
| 4,433,418 | 2/1984 | Smith | 372/95 |
| 4,477,909 | 10/1984 | Salvi et al. | 372/95 |
| 4,520,486 | 5/1985 | Lavarini | 372/95 |
| 4,553,244 | 11/1985 | Benedict et al. | 372/95 |
| 4,797,894 | 1/1989 | Yaeli | 372/92 |
| 4,930,138 | 5/1990 | Opower | 372/95 |
| 5,058,123 | 10/1991 | Yasui et al. | 372/95 |

*Primary Examiner*—Léon Scott, Jr.
*Attorney, Agent, or Firm*—Evenson, McKeown, Edwards & Lenahan

[57] ABSTRACT

Laser resonator, particularly for carbon dioxide lasers, with two resonator end mirrors having active material between two fully reflecting end mirror faces, which form an unstable resonator cavity, and with at least one third, completely reflecting mirror face reflecting the laser radiation prior to its coupling out through a coupling-out opening of the resonator. So that the laser only requires a reduced degree of coupling out and/or has an improved beam quality, it is constructed in such a way that, in addition to the unstable resonator cavity, between the two end mirrors is provided at least one stable resonator cavity and that the stable resonator cavity is made from the same active material of the third mirror face as the face of one of the two end mirrors with the face of the other end mirror.

11 Claims, 9 Drawing Sheets

FIG. 1
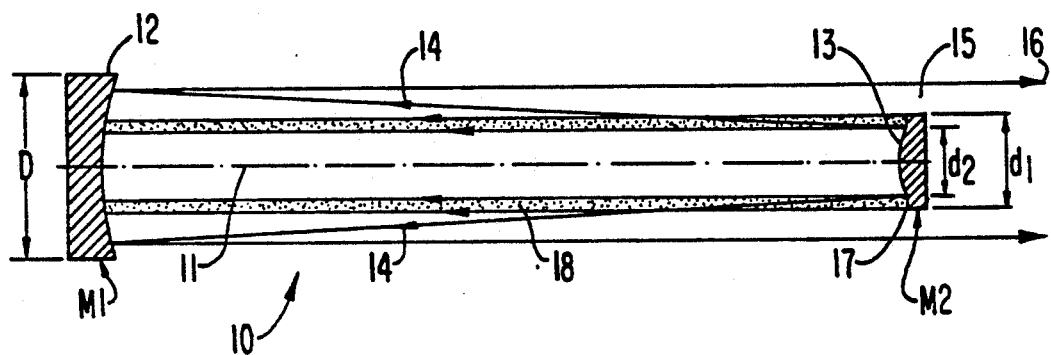
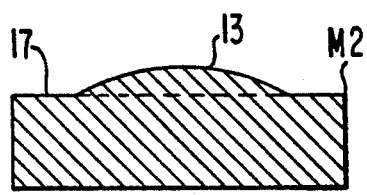
FIG. 2a
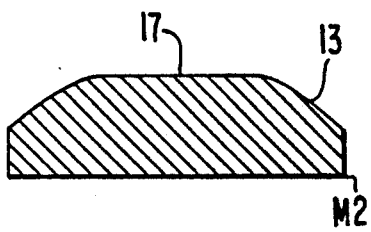
FIG. 2b
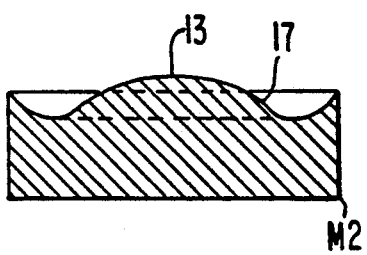
FIG. 2c

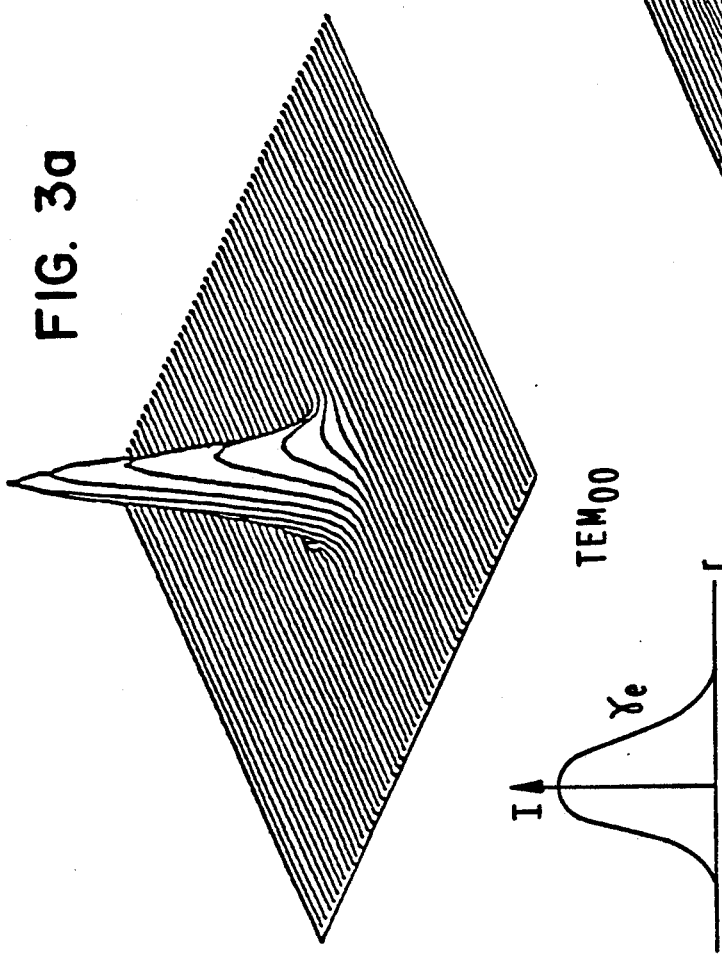
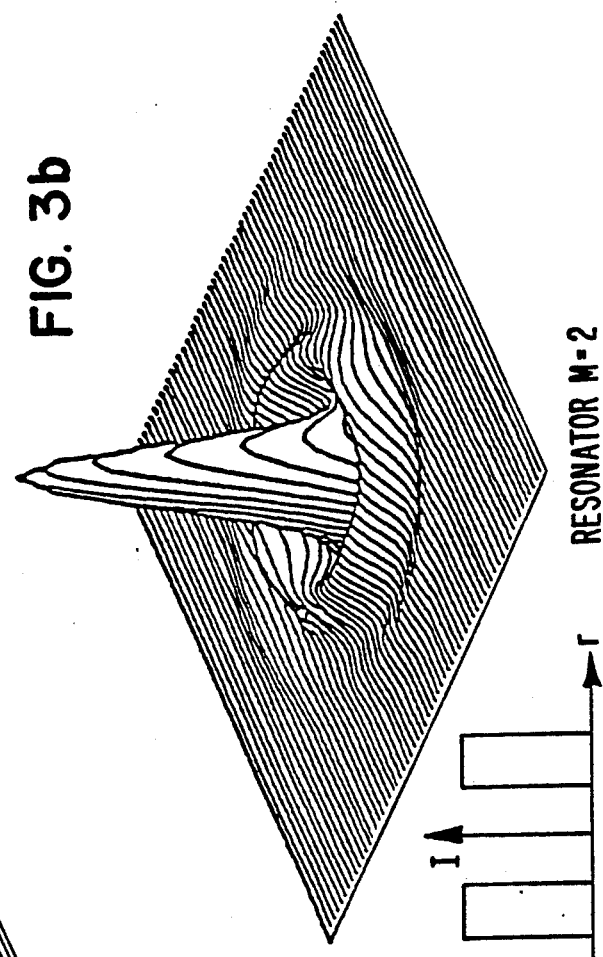
FIG. 3a
FIG. 3b

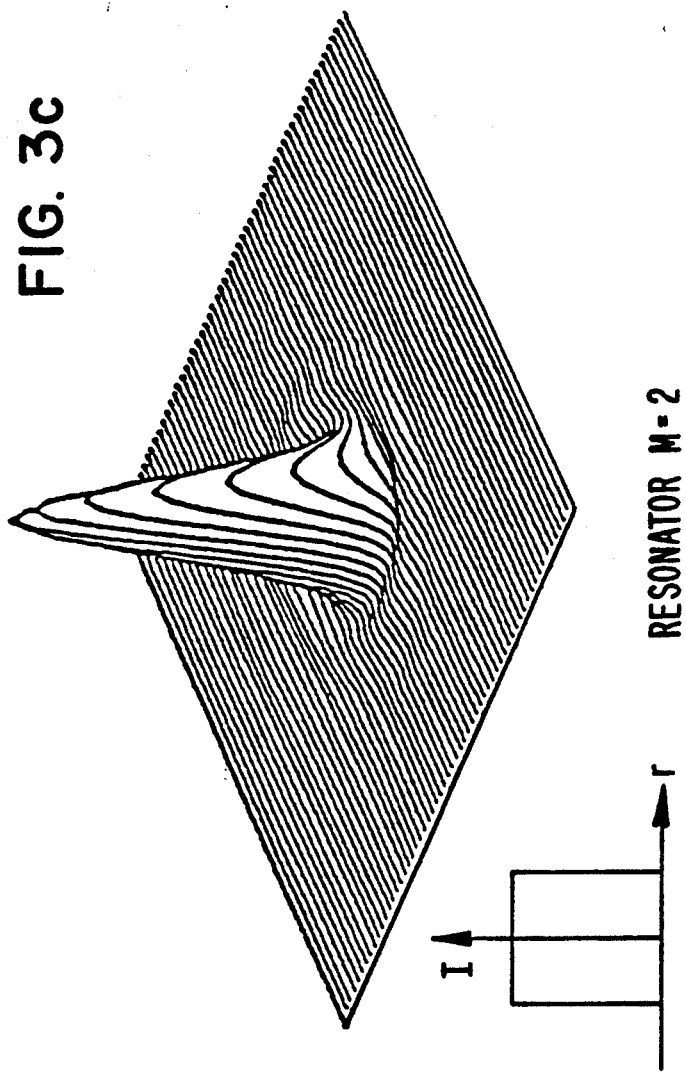

LASER RESONATOR

DESCRIPTION

1. Technical Field

The invention relates to a laser resonator, particularly for carbon dioxide lasers, with two cavity resonator end mirrors, which have active material between two fully reflecting end mirror faces, which form an unstable resonator cavity and with at least one third, completely reflecting mirror face with which the laser radiation is reflected prior to its coupling out brought about by a coupling-out opening of the resonator.

The coupling out of laser radiation or illumination and therefore laser power from the optical resonator of the laser is normally brought about in that a resonator mirror is either constructed in partly transmitting manner, or by it radiating out from the resonator area laser radiation. Resonators with partly transmitting mirrors are preferably stable resonators, in which the laser beam as a result of the focussing action of one or both mirrors remains localized around the resonator axis in the area defined by the mirrors. Such a construction of stable resonators with rotational symmetry about the resonator axis has the advantage that the coupled out laser radiation has a high beam quality. This is e.g. determined by the distance over which the laser beam propagates in an approximately parallel manner or is a measure for how small the focal spot can be on which the laser beam can be focussed or how large is the maximum achievable intensity. The theoretically highest quality for the beam distribution is obtained according to the Gaussian predominant mode TEM 00. Other beam distributions, e.g. TEM 01 have decreasing beam quality with increasing beam diameter. However, a large beam diameter is necessary to achieve high output power levels, if it is assumed that the latter require large active material volumes and the resonator length is limited for obvious reasons. Thus, in principle, an increase in the output power by increasing the beam diameter is linked with a deterioration of the beam quality. In addition, the transmitting mirrors cannot be loaded to a random high level, i.e. must not be excessively heated by the laser radiation passing through them, so that their optical effect is not impaired and their material is not destroyed.

2. Prior Art

It is generally known to equip optical resonators with fully reflecting mirrors, which are constructed and arranged in such a way that a certain proportion of the laser radiation leaves the resonator area following several revolutions. Coupling out conventionally takes place with a pinhole or so-called scraper mirror, which produces the hollow beam characteristic of unstable resonators. Such unstable resonators normally have a high degree of coupling out and consequently presuppose active material with a correspondingly high amplification or gain. The beam quality is generally lower by a factor of 3 to 4. It is particularly low if the degree of coupling out is kept low, e.g. by a corresponding dimensioning of the reflecting faces bringing about coupling out. An additional fundamental disadvantage of the unstable resonator construction is the comparatively high adjustment sensitivity of its mirrors and its sensitivity to optical reactions, i.e. with respect to light reflection from the processing point into the resonator.

Apart from the generally known unstable resonator, U.S. Pat. No. 3,681,709 discloses a laser resonator, particularly for carbon dioxide lasers, with two resonator end mirrors, which have active material between two fully reflecting end mirror faces, which form a resonator cavity, and with at least one third completely reflecting mirror face with which the laser radiation or illumination is coupled out of the resonator. The third mirror face used for coupling the laser radiation from the resonator is constructed as the end mirror face of one of the two end mirrors. The resonator chamber between the two end mirror faces is stable and the third mirror face of one mirror is used exclusively for coupling out from the stable resonator laser light oscillating in the predominant mode. An unstable resonator cavity is not present in the known resonator. The laser radiation is in fact coupled out by the third face of one end mirror directly on a focussing mirror of a focussing system.

DESCRIPTION OF THE INVENTION

The problem of the invention is to so improve an unstable resonator of the aforementioned type, that it makes do with a reduced degree of coupling out and/or has an improved beam quality.

This problem is solved in that between the two end mirrors there is at least one stable resonator chamber in addition to the unstable resonator chamber and that the stable resonator chamber in addition to the unstable resonator chamber is made from the same active material of the third mirror face as the end mirror face of one of the two end mirrors with the end mirror face of the other end mirror.

The mixed construction constituted by a stable and an unstable resonator is important for the invention. The stable resonator cavity increases the average time spent by the radiation in the resonator, so that the radiation intensity therein rises. Consequently the active material is operated more strongly towards saturation and the efficiency rises. There is consequently a decrease in the degree of coupling out, i.e. the ratio of the coupled out power to the power produced in the resonator. Thus, unstable resonators provided with a stable resonator cavity can be used in laser systems with a comparatively low amplification or gain in order to produce the same external laser beam power. In addition, through the influence of the stable resonator cavity, the internal structure of the coupled out laser beam is so modified compared with conventional resonators, that a higher beam quality or a lower focal radius is obtained. This will be explained by embodiments hereinafter.

Advantageously the third mirror face as the end mirror face of one of the two end mirrors forms with the latter a unit or is a component of said mirror. This leads to a fixed spatial association between the end mirror faces, which reduces the adjustment sensitivity of the resonator and consequently increases the beam quality. The end mirror having the two mirror faces can in the requisite form be produced with corresponding high precision by turning and milling machines, e.g. in rotation symmetrical manner. Acceptable effort and expenditure leads to the necessary high surface quality and shape tolerance with lambda/10 to lambda/20.

Appropriately the third mirror face is at right angles to the resonator axis, which helps to bring about a symmetrical construction of the laser beam and is also advantageous for the production of the third mirror face or other mirror faces, e.g. if one of these forms a unit with the third mirror face. Thus, there are rotationally symmetrical and consequently advantageous mirror faces, it the third mirror face is circular or annular.

A simple resonator arrangement from the constructional standpoint is obtained if the laser radiation can be coupled out as a hollow beam through a coupling-out opening with adapted cross-section and the third mirror face is located in the vicinity of said opening within the hollow beam.

The invention also relates to a laser resonator, particularly for carbon dioxide lasers, with a resonator formed by two fully reflecting resonator end mirrors and with a circular light passage opening at right angles to the resonator axis in one of the end mirrors Such a laser resonator is known from EU-OS 0 100 089. One end mirror of the resonator has a hole or pinhole, so that the laser radiation from the other end mirror can pass through said hole to the reflecting mirror, which reflects in parallel the radiation striking it by means of a cone provided with spherical reflecting faces and a circular ring-shaped, concave, spherical reflecting face connected radially thereto onto the mirror provided with the hole. In this known unstable resonator, coupling out takes place with a scraper mirror positioned between the two end mirrors, so that the laser beam provided is a standard hollow beam.

In order to improve the aforementioned resonator in such a way that it only requires a reduced degree of coupling out and/or has an improved beam quality, the light passage opening at right angles to the resonator axis is a coupling-out opening forming a solid beam. In the cross-section of said solid beam, the complete coupled-out laser power is concentrated close to the resonator or longitudinal axis, so that there is a corresponding improvement to the beam quality, particularly with far field observation of the intensity distribution over the beam cross-section. At the same time the laser resonator can have a simpler construction, because there is no need to deflect the light in the resonator for its basic construction.

An advantageous construction of the resonator is obtained in that the end mirror having the circular opening has a circular ring-shaped convex or concave end mirror face facing the other end mirror and that the other end mirror has a circular ring-shaped concave or convex end mirror face provided with an internal diameter tending towards zero. The fundamental condition for the shaping of the two end mirror faces is merely that, for producing the solid beam, they produce no reflection beams migrating radially outwards from the reflection area starting from the resonator axis, so that the entire coupled-out laser radiation is available with the solid beam. However, it is also possible to form stable resonator cavities cooperating with the resonator area formed by the two end mirror faces and which are superimposed. This is achieved in that radially outwards and/or inwards on the circular ring-shaped end mirror face of the end mirror having the opening is connected an end mirror face forming a stable outer and/or inner resonator chamber with the concave face of the other end mirror. In the case of such resonators use is made of the two aforementioned basic solution ideas together in the sense of reducing the degree of coupling out and/or improving the beam quality.

In the case of resonators with fading out of the solid beam, it is important to eliminate local fluctuations of the laser radiation intensity, which result from the fact that on passing through the resonator the beam is directly phased out from the outside to the centre axis of the resonator. Such fluctuations are counteracted in that at least one first end mirror has a face enabling a radiation fraction reflected by the second end mirror to be reflected over the centre axis of the resonator onto the second end mirror. The aforementioned features lead to a coupling between areas of an end mirror or both end mirrors facing diagonally over and beyond the centre axis, if the mirror face is correspondingly constructed.

A simple construction of the resonator arrangement with respect to the end mirror face used for coupling is obtained if said face has a concave construction and is arranged concentrically to the centre axis and forms with a circular ring-shaped end mirror face arranged directly round the light passage opening a stable resonator cavity. Apart from reducing the fluctuations of the laser intensity emanating from the unstable resonator area in the case of coupling out of the solid beam, this stable resonator cavity leads to an improvement of the beam quality.

A constructionally simple embodiment of a stable resonator is obtained in that the second end mirror having the circular light passage opening has a planar scraper mirror and the other end mirror a circular ring-shaped, concave end mirror face. The planar scraper mirror is simple to produce for all the necessary dimensions, which is particularly advantageous if, following the production of the comparatively complicated first end mirror, it has to be matched to the latter.

In order to avoid quality problems to the laser radiation by points, tips, etc. of the first end mirror located in the vicinity of the axis of symmetry, facing the light passage opening of the second end mirror the first end mirror is provided with a plane surface passing tangentially into the curvature areas of the concave end mirror faces.

As a result of the cooperation of a plane mirror and a convex mirror, the previously described embodiment constitutes a stable resonator.

BRIEF DESCRIPTION OF THE DRAWINGS

The invention is described hereinafter relative to embodiments and the attached drawings, wherein show:

FIG. 1 the beam guidance within a first resonator according to the invention.

FIGS. 2a to 2c possible variants of the mirror M2 in FIG. 1.

FIGS. 3a to 3c the near field intensity distributions I=f(r) and the far field intensity distribution associated therewith in diagrammatic form.

Figure 4:
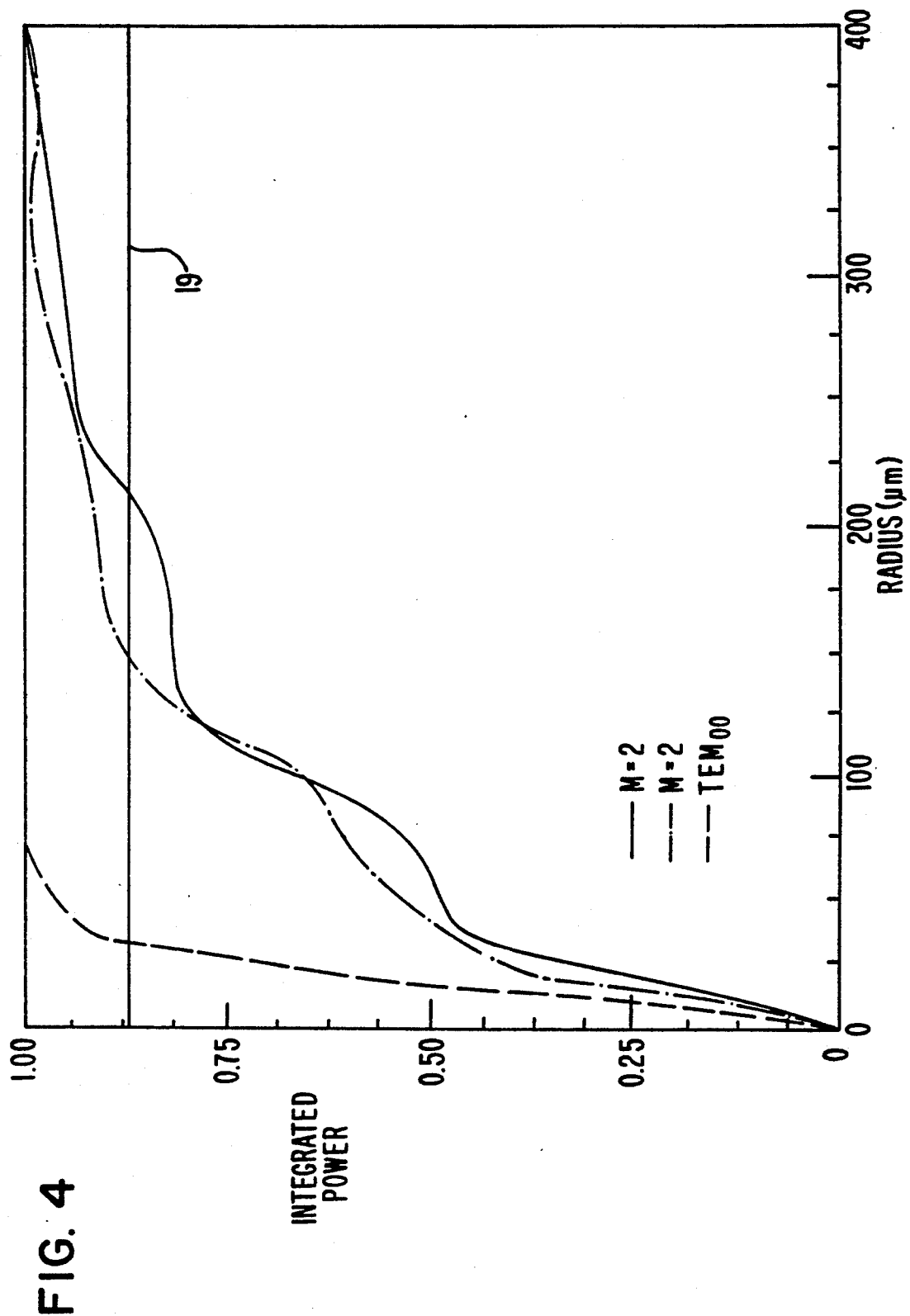
FIG. 4 a radially integrated intensity distribution I=f (radius).

BEST WAYS TO PERFORM THE INVENTION.

The resonator 10 shown in FIG. 1 comprises two rotationally symmetrically constructed mirrors M1 and M2. In the case of a correspondingly rotationally symmetrically constructed active material 40, shown in dot-dash manner, said mirrors can be used with particular advantage. However, a different construction of the mirrors M1,M2 is also possible, e.g. rectangular, so as to be able to use in optimum manner active material 40 with a corresponding rectangular cross-section.

The dimensions of the mirrors M1,M2 are designated D, d1 and d2 and give the diameters for said rotationally symmetrical mirrors, which together form the resonator axis 11. The mirror M1 is a concave mirror with a corresponding fully reflecting, concave mirror face 12, which is e.g. metallic. The mirror M2 is also metallic and therefore fully reflecting and has a convex mirror face 13. The two fully reflecting mirror faces 12,13 form an unstable resonator or resonant cavity 10′, i.e. the light beams reflecting between them do not remain in the cavity 10′ or axially parallel and instead migrate radially outwards, as indicated by arrows 14, so that there is a coupling out of the resonator 10 by an annular coupling-out opening 15 in FIG. 1, so that the coupled-out laser beam 16 is in the form of a hollow beam or with a so-called ring mode. The laser beam 16 is shaped optically, e.g. collimated outside the resonator 10 and supplied to a particular use, e.g. for welding.

However, apart from the mirror face 13 with the diameter d2, the mirror M2 has a third mirror face 17 with an external diameter d1. The third mirror face 17 is planar and at right angles to the resonator axis 11, so that it is directed onto the face 12 of the mirror M1. It forms together therewith a stable resonator cavity 18, which is hollow cylindrical and stressed by dotting in FIG. 1. In said stable resonator cavity the laser radiation is produced with a mode having a comparatively high beam quality or a smaller focal radius of its laser radiation than in the case of such radiation between the mirror faces 12,13, which will be explained relative to FIGS. 3a to 3c and 4.

In FIG. 3a I=f(r) represents the so-called Gaussian predominant mode TEM 00, i.e. the intensity distribution is in accordance with a Gaussian error curve. This representation applies to the intensity distribution in the near field of the laser or resonator. Also in the far field the laser intensity is concentrated according to FIG. 3a on the paraxial radius regions. The representation relates to the intensity distribution in the focus of a 20 cm lens. FIG. 3b shows comparable representations for a hollow beam I=f(r) in the near field and diagrammatically in the far field. It is clear that in the far field, which is determinative for the relationships of the laser beam at the point of use, although there is a concentration of the intensity in the vicinity of the beam axis, it is clear that the intensity is still considerable at greater spacings. The inventive resonator construction here leads to an improved result with reduced intensities outside the central intensity cone. This can be gathered from FIGS. 3c and 4, where the value free-related integrated power is shown as a function of the laser beam radius in the focus of a lens (focal length 20 cm). The beam radius is fixed in the conventional way defining that 86% of the laser power is within a circle with said radius. This gives the shown paths for the ideal case of TEM 00 in broken line representation, for the conventional unstable resonator with M=2 corresponding to the continuous line curve and for an inventive resonator with a stable cavity corresponding to the dot-dash line curve. Line 19 shows that the radius is reduced by up to 40% for the intensity distribution in the case of the inventive resonator.

Figure 5:
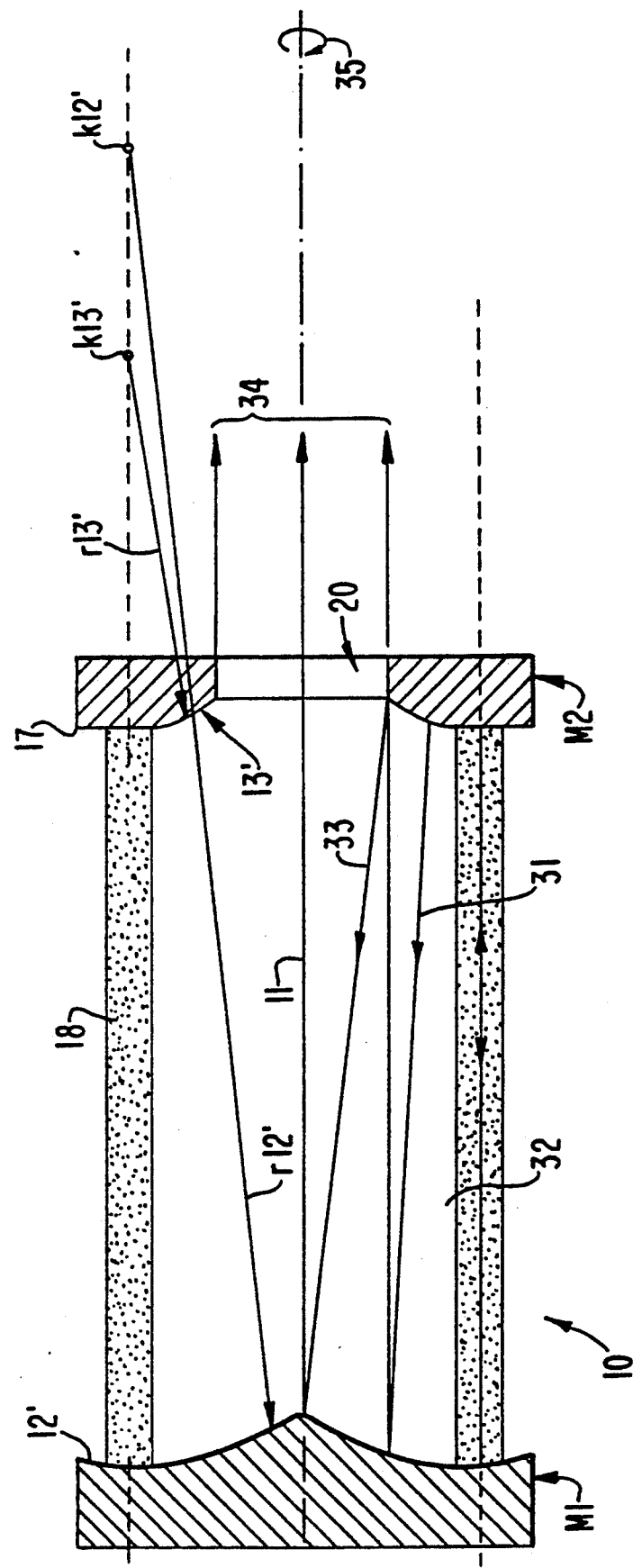
FIGS. 5 to 7 further embodiments according to the invention.
Figure 6:
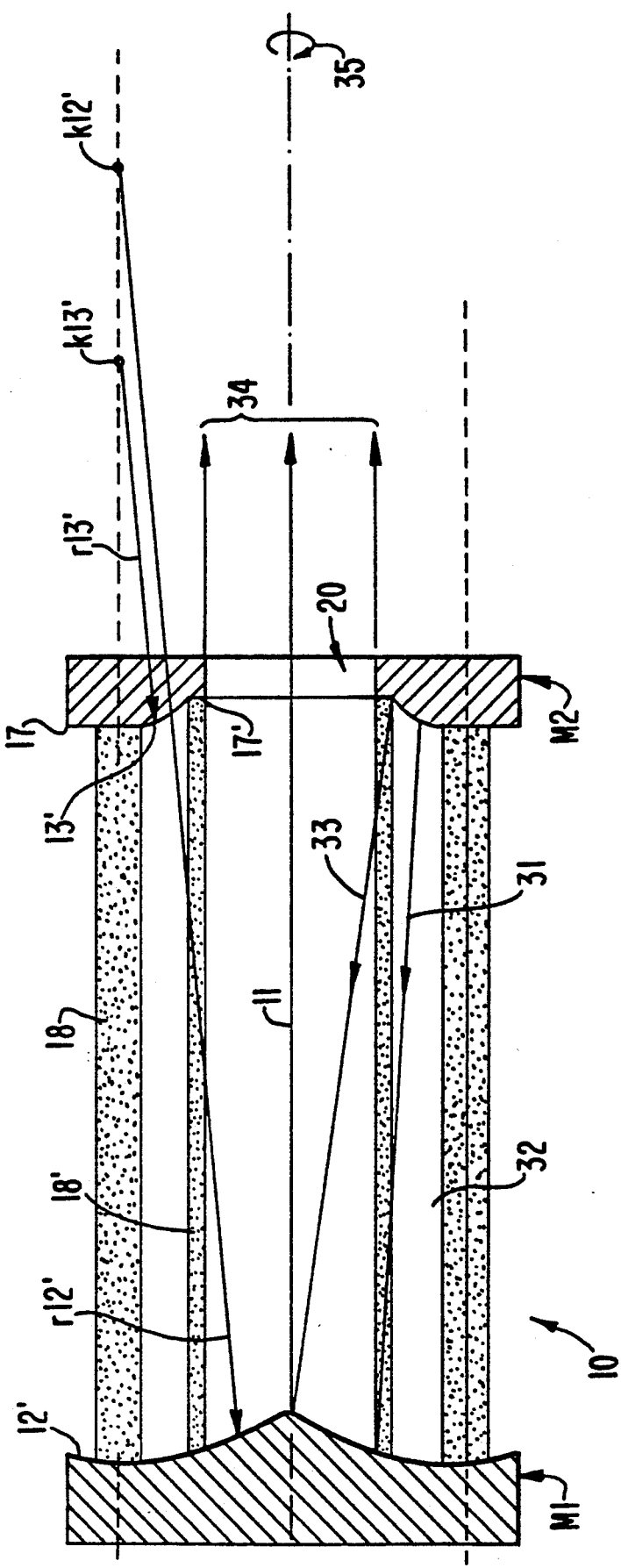
Figure 7:
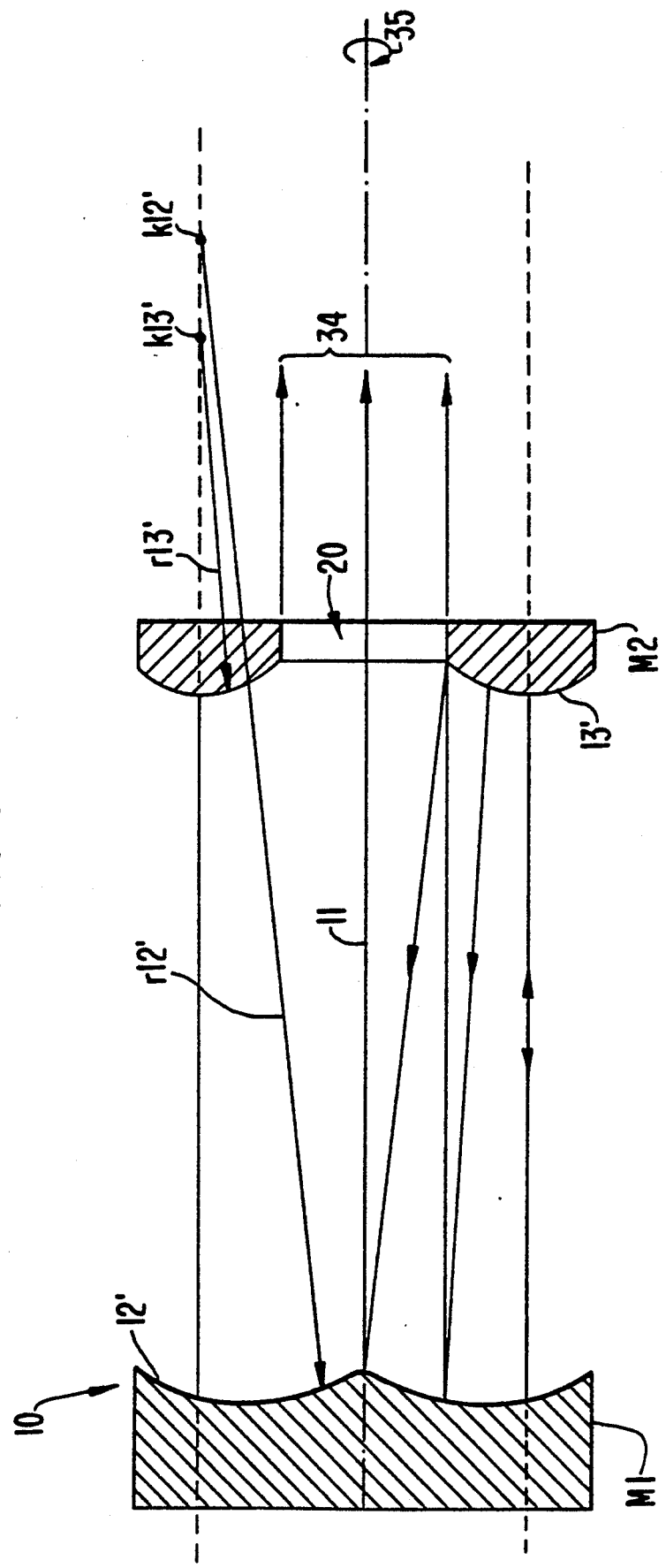

The resonators 10 shown in FIGS. 5 to 7 in each case comprise the two fully reflecting mirrors M1 and M2, which face one another and form the resonator axis 11. The mirror M1 has a circular ring-shaped, concave mirror face 12′ with the associated radius r12′ and an associated curvature centre k12′. In the vicinity of the resonator axis 11 the mirror face 12′ is rounded, in order to avoid a point and therefore an inhomogeneity location for the reflection of light.

The other mirror M2 is circular ring-shaped and has a light passage opening 20 at right angles to the resonator axis 11. The face facing the mirror M1 comprises a convex mirror face 13′ and a third, planar mirror face 17. Therefore the latter forms with the mirror face 12′ a stable resonator cavity 18, which is hollow cylindrical. In the interior of the hollow cylindrical, stable cavity 18, the radiation path is substantially determined by the convex mirror face 13′, whose radius r13′ can be calculated from the associated curvature centre k13′. From the comparison of the position of the curvature centres k12′,k13′, it is clear that the resonator is unstable with respect to the intermediately reflected radiation. Consequently it is clear from the beam path shown in the lower half of FIG. 5, that within the unstable resonator cavity 32 between the stable resonator cavity 18 and the beam path 31, reflections occur between the mirror faces 12′,13′, whilst the beam fraction characterized by the paths 31,33 is used for forming the full or solid beam 34, which is therefore coupled out by the light passage opening 20 acting as a coupling-out opening. Due to the rotationally symmetrical construction of the mirrors M1,M2, which is indicated by the arrow 35, the intensity distribution in the solid beam 34 is also rotationally symmetrical.

The resonator 10 of FIG. 6 differs from that of FIG. 5 in that between the mirror face 13′ and the opening 20 there is a further mirror face 17′ acting in the same way as the third mirror face 17. This leads to a further stable resonator cavity 18′, which increases the beam quality and reduces the degree of coupling out relative to the full beam 34.

In the resonator 10 of FIG. 7 two mirrors M1,M2 are shown, which have no mirror faces for forming a stable resonator cavity. In spite of this there is an improvement to the beam quality and a reduction to the degree of coupling out due to the fact that the laser radiation is coupled out as a solid beam 34. Thus, there are only mirror faces 12′,13′, which satisfy the conditions for an unstable resonator. Otherwise the mirror faces 12′,13′ or the mirrors M1,M2 are constructed in the manner described relative to FIGS. 5 and 6. A full beam 34 produced with the resonator according to FIG. 7 will not have the quality of the full beams 34 of the resonators of FIGS. 5 and 6, but it is clearly improved compared with conventional hollow beams. In the cases of FIGS. 1, 5 and 6, it is possible to construct the mirror faces 17,17′ determining the stable resonator cavity 18,18′ differently from those constructed, provided that the conditions for a stable cavity are fulfilled. Examples for this are shown in FIGS. 2a to 2c. Whilst FIG. 2a shows a side view of the mirror M2 of FIG. 1, i.e. with a centrally arranged convex mirror face 13 and a third, planar mirror face 17 arranged in annular manner around the same, the third mirror face 17 according to FIG. 2b is arranged in the centre of the mirror M2. The mirror face 13 is constructed as a concave ring, which is connected radially outwards to the mirror face 17 and, apart from forming an unstable resonator cavity 10′, is used for coupling out the laser radiation or illumination. This avoids a superimposing of the beam paths and a resulting beam quality reduction. According to FIG. 2c the mirror face 13 leading to the instability of the resonator 10 is positioned centrally, i.e. as in FIGS. 1 and 2a. However, this is followed by a third, concave mirror face 17, which focuses the light, so that modifications of the mirror face 12 relating thereto can be carried out. Such mirror faces or mirror M2 can be constructed in the most varied combinations with the other mirrors M1, provided that it is ensured that the beam quality is improved and/or the degree of coupling out is in particular reduced by corresponding stable resonator cavities.

Figure 8:
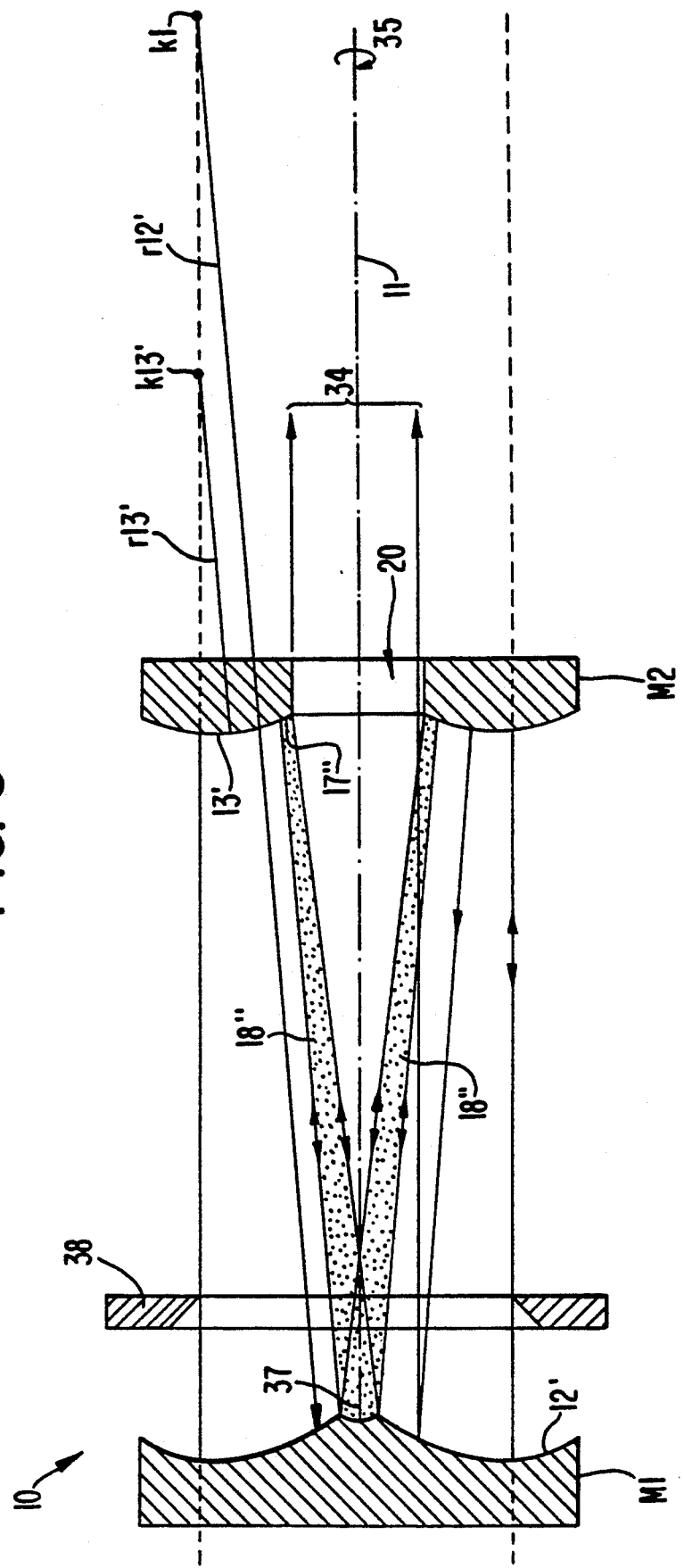
FIG. 8 another inventive embodiment avoiding laser intensity fluctuations.

The resonator 10 shown in FIG. 8 fundamentally has a construction like that of FIG. 7. Thus, reference should be made to FIG. 8 in connection with the description of mirrors M1,M2 and their faces 12',13'. In addition, there is a diaphragm 38 outwardly bounding the resonator cavity. The special feature of the resonator 10 in FIG. 8 is that the mirror M1 has a concave mirror face 37, which is located in the vicinity of the central tip of the mirror M1 in FIG. 7 and cooperates with a mirror face 17" of the second mirror M2. This mirror face 17" is connected directly to the light passage opening 20 for the coupled-out solid beam 34 and is circular ring-shaped. It forms a stable resonator cavity 18" with the mirror face 37. With the aid of the cavity 18", a radiation fraction reflected by the second mirror M2 is reflected beyond the centre axis 11 of the resonator 10 and with the aid of the mirror face 37 onto the second mirror M2.

Figure 9:
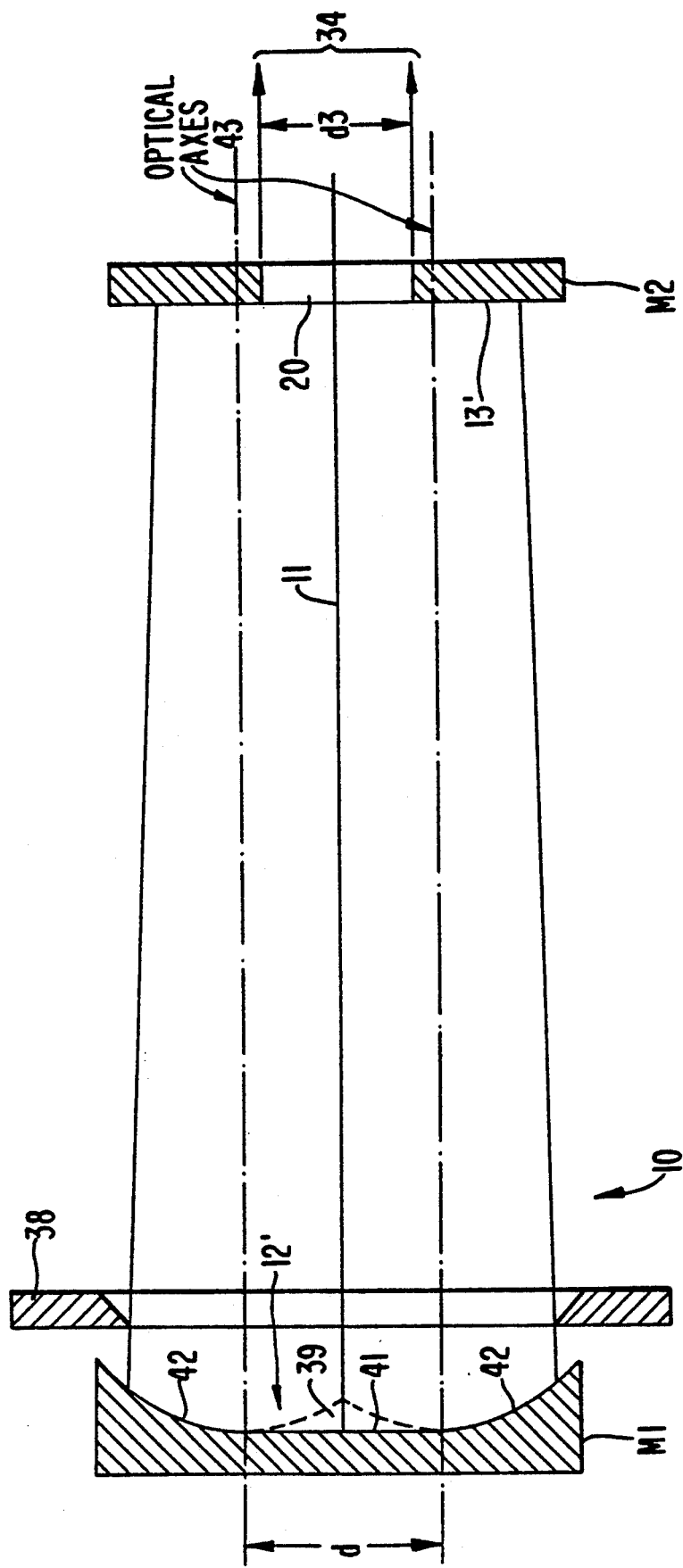
FIG. 9 inventive embodiments with a plane scraper mirror.

FIG. 9 diagrammatically shows the essential components of a stable resonator 10, namely the two end mirrors M1,M2. The mirror M2 is a planar pinhole mirror, whose hole forms a light passage opening 20 for the solid beam 34. The end mirror M2 which symmetrically faces it with respect to the resonator or symmetry axis 11 is provided with a circular ring-shaped, concave end mirror face 12'. Between the latter and the end mirror face 13' takes place the laser process occurring in the not shown active material, the diaphragm 38 forming an outer radial boundary. The optical axis 43 of the mirror system is ring-like with a diameter d and the diameter d3 for the opening 20 for coupling out a beam fraction is adapted thereto and is namely slightly smaller.

The resonator of FIG. 9 is a stable resonator, which is due to the fact that the mirror M2 has an infinitely large radius of curvature, so that the curvature centre of the mirror face 12' is located between the infinitely remote curvature centre of the mirror M2 and the same and consequently fulfills the condition for more stable resonance.

The central mirror tip 39 shown in FIG. 9 can disturb the oscillating process and can therefore lead to a deterioration of the beam quality. Therefore the end mirror M1 is provided with a plane surface 41, which avoids such interference. The plane surface 41 issues tangentially into the curvature areas 42 of the mirror M1, so that here again there are no disturbing inhomogeneities of the mirror face 12.

INDUSTRIAL USABILITY

The inventive laser resonator is used for so improving an unstable resonator, that it only requires a reduced degree of coupling out and/or has an improved beam quality.

We claim:

1. A laser resonator for a carbon dioxide laser, comprising two resonator mirrors placed on ends of an excitable active medium, at least one of the resonator mirrors having at least two fully reflecting surface zones with different curvature radii, wherein, between the two resonator mirrors, at least one stable resonator chamber is provided by surface zones of both resonator mirrors in addition to an unstable resonator chamber formed with other surface zones of the resonator mirrors, and radiation between the resonator mirrors is coupled out through an opening in one of the resonator mirrors.

2. The laser resonator according to claim 1, wherein the surface zone of the at least one mirror is at a right angle to a resonator axis.

3. The laser resonator according to claim 1, wherein the surface zone of the at least one mirror is annular.

4. The laser resonator according to claim 1, wherein one of the mirrors is a feedback mirror smaller than the other mirror, laser radiation being coupled out around the other mirror and having an annular intensity distribution, and the surface zone of the at least one mirror is at the periphery of the feedback mirror.

5. The laser resonator according to claim 1, wherein the mirrors are fully reflecting mirrors, one of which has a light output opening, and laser radiation out coupled from the output opening forms a solid beam.

6. Laser resonator according to claim 5, characterized in that the second end mirror (M2) having the circular light passage opening (20) is a planar pinhole mirror and the other end mirror (M1) has a circular right-shaped, concave end mirror face (12').

7. Laser resonator according to claim 6, characterized in that facing the light passage opening (20) of the second end mirror (M2) facing the first end mirror (M1) is provided with a plan surface (41), which passes tangentially into the curvature areas (42) of the concave end mirror face (12').

8. The laser resonator according to claim 5, wherein one of the mirrors having the opening is an end mirror having an annular-shaped fully reflecting surface zone facing the other mirror and provided by rotating one of a convex and a concave arc around a resonator axis, and the other mirror is an end mirror having a circular ring-shaped fully reflecting surface provided by rotating one of a concave and convex arc and are also having an inner diameter which approaches zero.

9. The laser resonator according to claim 5, wherein, at least one of radially outwardly and inwardly to an annular shaped fully reflection zone of the first-mentioned end mirror having the opening, a fully reflecting zone forming a stable resonator chamber is tangentially connected with a corresponding fully reflecting zone of the other end mirror.

10. The laser resonator according to claim 5, wherein, the fully reflecting zone of the second-mentioned end mirror is formed such that, in cross section, a laser radiation fraction outgoing from an upper part of the first-mentioned end mirror is reflected and incidences in a zone over and beyond a center axis of the resonator onto a lower part of the first-mentioned mirror and vice-versa.

11. Laser resonator according to claim 6, characterized in that the end mirror face (37) is concave and is arranged concentrically around the centre axis (11) and with a circular ring-shaped mirror face (17") arranged directly around the light passage opening (20) forms a stable resonator cavity (18").

* * * * *